United States Patent
Ossareh et al.

(10) Patent No.: US 9,850,831 B2
(45) Date of Patent: Dec. 26, 2017

(54) METHOD AND SYSTEM FOR ENGINE SPEED CONTROL

(71) Applicant: Ford Global Technologies, LLC, Dearborn, MI (US)

(72) Inventors: Hamid-Reza Ossareh, Ann Arbor, MI (US); Adam Nathan Banker, Canton, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 14/927,070

(22) Filed: Oct. 29, 2015

(65) Prior Publication Data

US 2017/0122229 A1     May 4, 2017

(51) Int. Cl.

| | | |
|---|---|---|
| *F02B 37/14* | (2006.01) | |
| *F02B 39/10* | (2006.01) | |
| *F02D 11/02* | (2006.01) | |
| *F02D 41/00* | (2006.01) | |
| *F02D 41/06* | (2006.01) | |
| *F02M 35/10* | (2006.01) | |
| *F02M 35/104* | (2006.01) | |

(52) U.S. Cl.
CPC .......... *F02D 41/0007* (2013.01); *F02B 37/14* (2013.01); *F02B 39/10* (2013.01); *F02D 11/02* (2013.01); *F02D 41/062* (2013.01); *F02M 35/104* (2013.01); *F02M 35/10157* (2013.01); *F02D 2200/0402* (2013.01); *F02D 2200/101* (2013.01); *Y02T 10/144* (2013.01)

(58) Field of Classification Search
CPC ...... F02B 37/18; F02B 37/013; F02B 33/446; F02B 37/025; F02B 37/005; F02B 37/14; F02B 37/16; F02B 33/44; F02B 39/10; F02B 37/105; F02D 23/00; F02D 11/02; F02D 41/0007; F02D 41/062; F02D 2200/0402; F02D 2200/101; F02M 35/10157; F02M 35/104; Y02T 10/144
See application file for complete search history.

(56) References Cited

U.S. PATENT DOCUMENTS

| | | | |
|---|---|---|---|
| 6,776,739 B2 | 8/2004 | Eguchi et al. | |
| 7,281,512 B2 | 10/2007 | Marentette | |
| 7,451,597 B2 | 11/2008 | Kojima et al. | |
| 8,635,987 B2 | 1/2014 | Ma et al. | |
| 8,694,231 B2 | 4/2014 | Ma et al. | |

(Continued)

OTHER PUBLICATIONS

Xiao, Baitao et al., "Methods and Systems for Boost Control," U.S. Appl. No. 14/942,487, filed Nov. 16, 2015, 38 pages.

(Continued)

*Primary Examiner* — Brandon Lee
(74) *Attorney, Agent, or Firm* — Julia Voutyras; McCoy Russell LLP (57) ABSTRACT

Methods and systems are provided for engine speed flare control in an engine system having multiple staged charge boosting devices. In one example, during an engine start, an upstream compressor is rotated backwards via an electric motor to reduce the intake manifold pressure. The engine is then fueled based on the lower manifold pressure to reduce torque and engine speed flare until idle engine speed conditions are reached.

17 Claims, 3 Drawing Sheets

(56) References Cited

U.S. PATENT DOCUMENTS

2015/0292399 A1\* 10/2015 Kubes ................ F02B 39/10
                                                                         60/315

OTHER PUBLICATIONS

Xiao, Baitao et al., "Methods and Systems for Boost Control," U.S. Appl. No. 14/799,289, filed Jul. 14, 2015, 34 pages.
Xiao, Baitao et al., "Methods and Systems for Boost Control," U.S. Appl. No. 14/799,342, filed Jul. 14, 2015, 35 pages.

\* cited by examiner

METHOD AND SYSTEM FOR ENGINE SPEED CONTROL

FIELD

The present description relates generally to methods and systems for reducing engine start speed flare-up in staged boosted engine systems configured with a turbocharger and a supercharger.

BACKGROUND/SUMMARY

During an engine start, the engine airflow is zero, and the intake manifold pressure is at ambient pressure. As a result, a significant amount of fuel may be added at an engine start to maintain stoichiometry of exhaust gases (which is required for emissions control). This leads to a large initial engine torque output which can cause the engine speed to flare up quickly until the intake manifold pressure and the engine speed are regulated. The engine speed flare-up at the engine start can result in a higher fuel consumption, degrading fuel economy. In addition, the flare-up results in NVH issues including extra noise from the engine, and palpable driveline vibrations.

Various approaches have been developed for reducing the speed flare at the engine start. For example, as shown by Ma et al. in U.S. Pat. No. 8,694,231, spark timing adjustments (in particular, spark timing retard) may be used to control the engine speed at the engine start towards a target engine speed that reduces flare. In another example, as shown by Marentette in U.S. Pat. No. 7,281,512, an assembly including a deformable member and a resilient member is coupled inside an intake plenum and used to vary the volume of the intake manifold. At the low engine speeds of an engine start, the assembly reduces the volume within the plenum, thereby reducing engine flare.

However the inventors herein have identified potential issues with such approaches. As one example, the reliance on spark timing retard reduces the fuel economy of the engine. As another example, the reliance on a dedicated assembly for selectively varying the volume of the intake manifold adds component and control costs.

The inventors herein have recognized that the compressor of an electric supercharger in staged boosted engine system can be advantageously used to reduce engine start-up speed flare. As such, engine systems may be configured with boosting devices, such as turbochargers or superchargers, for providing a boosted aircharge and improving peak power outputs. Therein the use of a compressor allows a smaller displacement engine to provide as much power as a larger displacement engine, but with additional fuel economy benefits. Further, one or more intake charging devices may be staged in series or parallel to an intake turbocharger to improve turbocharged engine boost response. In such an engine system, the compressor of an electric supercharger may be selectively operated in a reverse direction during the engine start-up to generate intake manifold vacuum. The resulting lower intake manifold pressure reduces the engine start fuel requirement, producing lowering engine torque, and reducing engine flare. One example method for reducing engine flare includes: during an engine start, spinning a compressor backwards to lower intake manifold pressure, a speed of the compressor based on engine speed. In this way, a quality of engine starts is improved.

As one example, a boosted engine system may include an electric supercharger coupled upstream of a turbocharger. In response to an engine start, an electric motor coupled to the controller of the electric supercharger may be operated to spin the supercharger compressor backwards (that is, in a direction opposite to the direction the compressor is spun in for boosted charge delivery). For example, the electric motor may be coupled to a reversing circuit that enables the supercharger compressor to be spun backwards. Alternatively, the motor may be coupled to an H-bridge that enables the compressor to be spun in forward and reverse directions. The spinning may be performed at a speed and for a duration that enables manifold pressure to be lowered to a threshold pressure. As a result of the lower pressure, less air needs to be pumped into the engine cylinders during the start (since the cylinder charge is a function of the intake pressure). Engine fueling may then be scheduled based on the lower charge requirement.

Herein, the lower intake air pressure results in a lower cylinder fueling requirement, and consequently a reduction in the engine torque output, and thereby engine speed flare. The reverse rotation of the supercharger compressor may be continued until an engine idling speed is reached. Once the engine has reached engine idle speed, backward rotation of the supercharger compressor may be ended. Optionally thereafter, forward rotation of the supercharger compressor may be enabled for boost control (such as to reduce turbo lag while the downstream turbocharger spins up).

In this way, by generating vacuum in an engine intake manifold during an engine start, the intake manifold pressure at the engine start may be lowered. The technical effect of rotating an electric supercharger compressor in reverse to generate vacuum is that existing engine components can be advantageously used to generate the vacuum, providing component and cost reduction benefits. The technical effect of using vacuum to lower an intake manifold pressure at an engine start is that less air needs to be pumped into engine cylinders, lowering the cylinder's fueling requirement. By delivering a smaller amount of fuel to an engine cylinder based on a lowered cylinder charge requirement, the engine may be operated at stoichiometry while an engine speed flare at the engine start-up is reduced. By lowering the engine torque and speed flare at the engine start, engine start NVH issues are reduced while fuel economy is improved. Overall, the quality and repeatability of engine starts are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
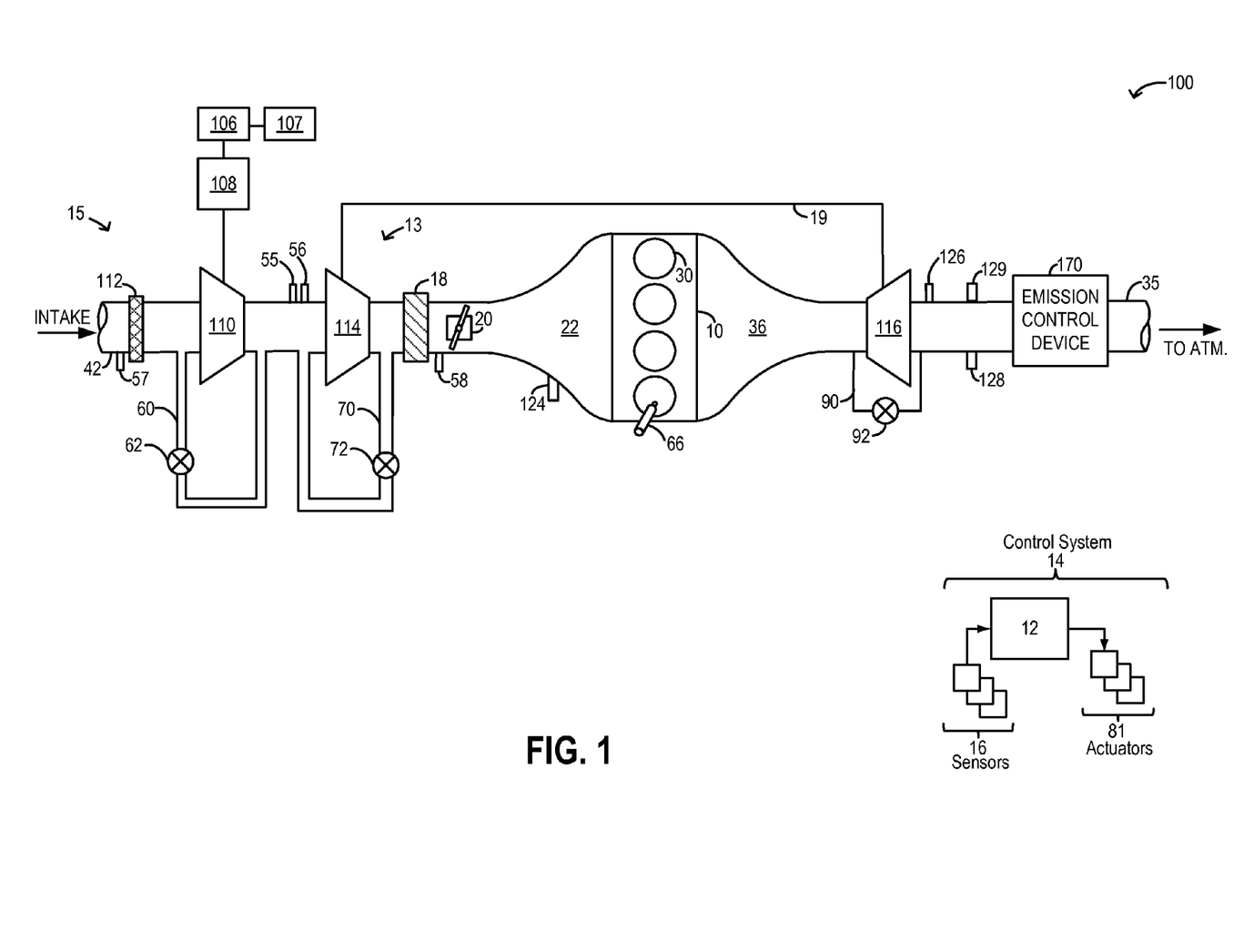
FIG. 1 shows an example embodiment of a boosted engine system having multiple staged charge boosting devices.

The following description relates to systems and methods for improving engine speed control during engine start-up in an engine system having staged boosting devices, such as in the boosted engine system of FIG. 1. A controller may be configured to perform a routine, such as the example routine of FIG. 2, to accelerate an upstream compressor during the start to lower manifold pressure, thereby reducing cylinder fueling and engine speed. An example engine speed control operation is shown with reference to FIG. 3. By operating the second compressor, engine speed flare-ups can be reduced, improving engine startability.

FIG. 1 schematically shows aspects of an example engine system 100 including an engine 10. In the depicted embodiment, engine 10 is a boosted engine including multiple, staged boosting devices. Specifically, engine 10 includes a first boosting device 15 staged upstream of a second boosting device 13. The configuration results in a first compressor 110 (of the first boosting device) being positioned in the engine intake passage 42 upstream of a second compressor 114 (of the second boosting device). In the present example, the first boosting device is an electric supercharger 15, while the second boosting device is a turbocharger 13.

Electric supercharger 15 includes first compressor 110 driven by electric motor 108. Motor 108 is powered by an on-board energy storage device, such as system battery 106. During a first set of conditions (such as during a tip-in), electric motor 108 may be operated to rotate first compressor 110 forwards. During a second, different set of conditions (such as during an engine start), electric motor 108 may be operated to rotate first compressor 110 backwards. In particular, motor 108 may be selectively coupled to a reversing circuit 107 that enables the motor to rotate the supercharger compressor backwards.

Fresh air is introduced along intake passage 42 into engine 10 via air cleaner 112 and flows to first compressor 110. One or more sensors may be coupled to the intake passage upstream of the air cleaner for estimating ambient air conditions, such as a pressure sensor for estimating barometric pressure (BP), an air flow sensor 57 for estimating manifold air flow (MAF), and an intake air temperature sensor for estimating air charge temperature (ACT). Air compressed by first compressor 110 is then delivered to second compressor 114. During selected conditions, as elaborated below, air may bypass supercharger 15 and be directed to turbocharger 13 through first compressor bypass 60 by adjusting the opening of a bypass valve 62.

Turbocharger 13 includes second compressor 114 driven by an exhaust turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air received at the compressor inlet of second compressor 114 is introduced into engine 10. During selected conditions, as elaborated below, air compressed by turbocharger 13 may be recirculated from the outlet to the inlet of compressor 114 through second compressor bypass 70 by adjusting the opening of a compressor recirculation valve (CRV) 72. CRV 72 may be a continuously variable valve and increasing the opening of the recirculation valve may include actuating (or energizing) a solenoid of the valve.

One or more sensors may be coupled to the intake passage upstream of the second compressor for estimating conditions of aircharge entering the second compressor, such as a pressure sensor 56 for estimating compressor inlet pressure (CIP), and a temperature sensor 55 for estimating compressor inlet temperature (CIT). Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC.

As shown in FIG. 1, second compressor 114 is coupled, through charge-air cooler (CAC) 18 (herein also referred to as an intercooler) to throttle valve 20. Throttle valve 20 is coupled to engine intake manifold 22. In some embodiments, an additional air intake system (AIS) throttle valve (not shown) may be included in intake passage 42, upstream of first compressor 110 and downstream of air filter 112. From the first compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the second downstream compressor is a turbocharger compressor while the first upstream compressor is a supercharger compressor. However, other combinations and configurations of boosting devices may be possible.

During selected conditions, such as during a tip-in, when going from engine operation without boost to engine operation with boost, turbo lag can occur. This is due to delays in turbine spin-up of the second compressor 114 and a transient drop in throttle inlet pressure when the throttle opens at the tip-in. To reduce this turbo lag, during those selected conditions, both supercharger 15 and turbocharger 13 may be enabled. Specifically, while turbine 116 spins-up, boost pressure can be provided by the upstream supercharger compressor 110. Enabling the supercharger to reduce turbo lag includes drawing energy from battery 106 to spin motor 108, to thereby accelerate first compressor 110 in a forward direction. In addition, bypass valve 62 may be closed so as to enable a larger portion of air to be compressed by first compressor 110. Then, when the turbine has sufficiently spun up, and is capable of driving second compressor 114, the first compressor may be decelerated by disabling motor 108. In addition, bypass valve 62 may be opened so as to enable a larger portion of air to bypass second compressor 110.

During selected conditions, such as during a tip-out, when going from engine operation with boost to engine operation without boost, or reduced boost, compressor surge can occur. This is due to a decreased flow through the second compressor when the throttle closes at the tip-out. The reduced forward flow through the second compressor can cause surge and degrade turbocharger performance. In addition, surge can lead to NVH issues such as undesirable noise from the engine intake system. To reduce compressor surge, at least a portion of the aircharge compressed by second compressor 114 may be recirculated to the compressor inlet. This allows flow through the second compressor 114 to remain relatively high and excess boost pressure to be substantially immediately relieved, both of which reduce tendency for compressor surge. The compressor recirculation system may include a recirculation passage 70 for recirculating (warm) compressed air from the compressor outlet of second compressor 114, upstream of charge-air cooler 18 to the compressor inlet of second compressor 114. In some embodiments, the compressor recirculation system may alternatively, or additionally, include a recirculation passage for recirculating (cooled) compressed air from the compressor outlet, downstream of the charge-air cooler to the compressor inlet.

One or both of valves 62 and 72 may be continuously variable valves wherein a position of the valve is continuously variable from a fully closed position to a fully open position. Alternatively, compressor recirculation valve 72 may be a continuously variable valve while compressor bypass valve 62 is an on-off valve. In some embodiments, CRV 72 may be normally partially open during boosted engine operation to provide some surge margin. Herein, the partially open position may be a default valve position. Then, in response to the indication of surge, the opening of CRV 72 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 72 may be held closed during boosted engine operation (e.g., peak performance conditions) to improve boost response and peak performance.

The inventors herein have recognized that the supercharger compressor can also be advantageously rotated backwards during selected conditions to lower the intake manifold pressure, such as by generating intake manifold vacuum. In particular, by coupling electric motor 108 to the reversing circuit 107, first compressor 110 can be rotated backwards (that is, in a direction opposite to the direction in which the first compressor is driven when providing pressurized air to the engine and boost assist to the turbocharger compressor). Thus, during an engine start, the first compressor may be rotated backwards to lower the intake manifold pressure (MAP). The first compressor may be rotated backwards at a speed, and/or for a duration that is based on engine speed relative to a threshold. For example, the first compressor may be rotated based on (current) engine speed relative to engine idling speed. The lower MAP results in a smaller amount of aircharge in the cylinders. Consequently, engine cylinders need less fuel to maintain stoichiometric engine operation (for emissions compliance reasons). Thus, while the first compressor is rotated backwards, the engine may be fueled based on the lower manifold pressure. The lower torque output results in a lower engine speed output, reducing an engine speed flare-up that may have otherwise occurred during the engine start. Once the engine is at idling speed (or an alternate threshold speed), the reverse rotation of the first compressor may be discontinued.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. Wastegate actuator 92 may be actuated open to dump at least some exhaust pressure from upstream of the turbine to a location downstream of the turbine via wastegate 90. By reducing exhaust pressure upstream of the turbine, turbine speed can be reduced.

The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of second compressor 114, first compressor 110, or both.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, and MAF sensor 57. Other sensors such as additional pressure, temperature, air/fuel ratio, and composition sensors may be coupled to various locations in engine system 100. The actuators 81 may include, for example, throttle 20, compressor recirculation valve 72, compressor bypass valve 62, electric motor 108, wastegate actuator 92, and fuel injector 66. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIG. 2. As an example, controller 12 may send signals to actuate electric motor 108 to rotate first compressor 108 forwards or backwards. As another example, controller 12 may send signals to an electromechanical actuator coupled to the intake throttle to actuate the intake throttle to a more open position.

Figure 2:
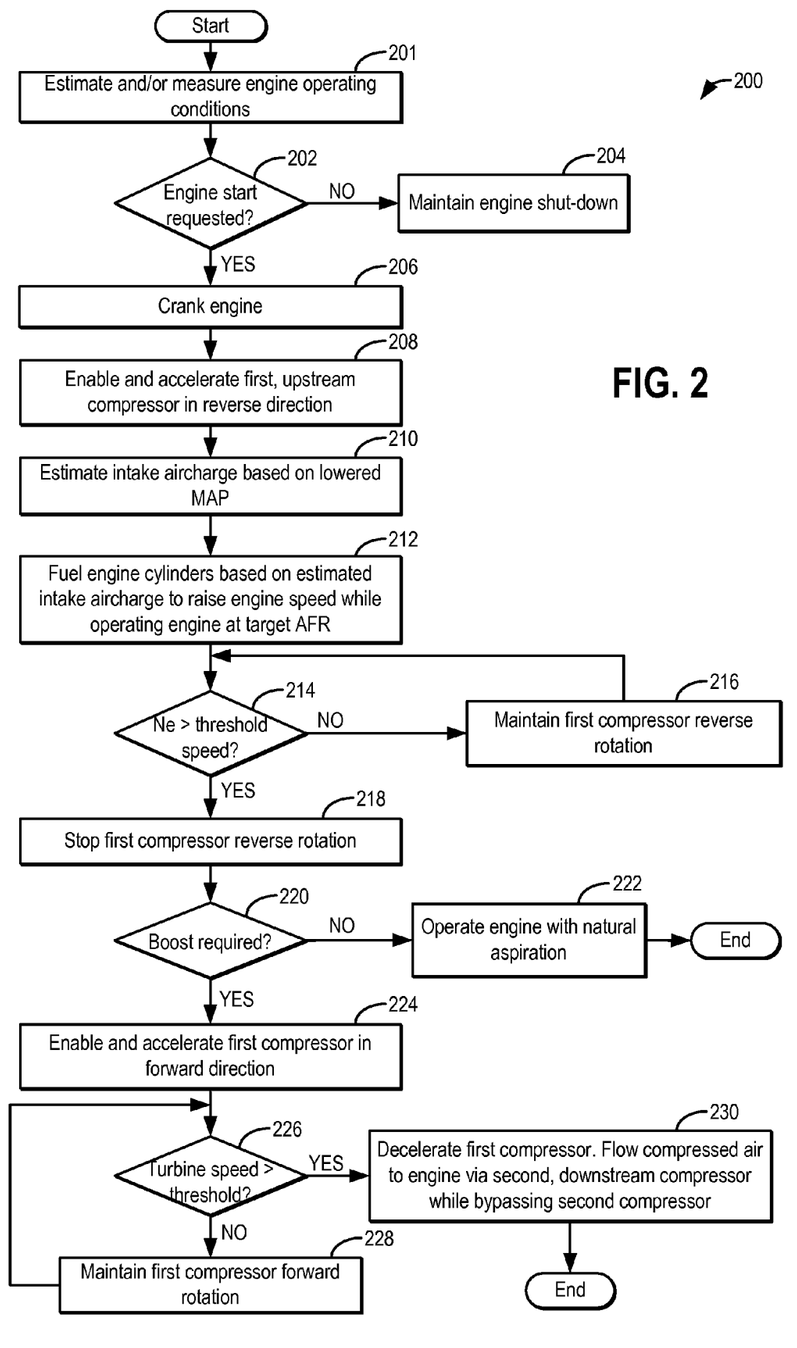
FIG. 2 shows a high level flow chart illustrating a routine that may be implemented for reducing engine start speed flare by operating a supercharger compressor.

Turning now to FIG. 2, an example routine 200 is shown for spinning a compressor of an upstream boosting device (e.g., supercharger) in a reverse direction during an engine start to reduce engine speed flare-up. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system, such as the actuators described above with reference to FIG. 1, to adjust engine operation according to the methods described below.

At 201, the method includes estimating engine operating conditions, such as ambient conditions (ambient temperature, pressure, humidity), engine temperature, pedal position, operator torque demand, etc. At 202, it may be determined if an engine start has been requested. In one example, an engine start request may be confirmed based on a key being inserted into an ignition and rotated to an engine on position. In another example, an engine start request may be confirmed based on an operator torque demand being higher than a threshold. If an engine start is not confirmed, at 204, the engine may be maintained shutdown and at rest.

If an engine start is confirmed, then at 206, the method includes cranking the engine, such as via a starter motor. At 208, the method includes enabling and accelerating the first, upstream compressor in a reverse direction. While spinning the first compressor backwards, an intake throttle may be held open. In addition, while spinning the first compressor backwards, a bypass valve (such as bypass valve 62) may be held closed. Herein, the compressor is a first, upstream compressor of a supercharger and during the engine start, the controller may spin the first, upstream compressor of the supercharger backwards to generate intake manifold vacuum, thereby lowering intake manifold pressure.

The spinning of the first compressor may be driven by an electric motor such that enabling and accelerating the first compressor in the reverse direction includes actuating and operating the electric motor. As such, the electric motor may also be used during other conditions to enable and accelerate the first compressor in a forward direction. The electric motor may be electrically coupled to a reversing circuit to drive the first compressor in the reverse direction. In comparison, the electric motor may be electrically decoupled from the reversing circuit to drive the first compressor in the forward direction. Alternatively, an H-bridge may be used to actuate the motor in both the forward and reverse directions.

The first compressor may be positioned upstream of a second compressor driven by an exhaust turbine via a shaft. In other words, the first compressor may be a first, upstream supercharger compressor while the second compressor may be a second, downstream turbocharger compressor. Herein, while spinning the first compressor backwards, the method includes not spinning the second compressor. That is, the second compressor may be maintained deactivated while the first compressor is spun backwards during the engine start.

As such, electric superchargers may have a response time (that is, idle to 100% duty cycle) of 130-200 ms and therefore may be able to spin backwards and reduce the manifold pressure very quickly during the engine start (such as within 1-2 seconds). Therefore, by relying on the electric supercharger to reduce the manifold pressure, the engine speed can be quickly brought under control during the engine start.

At 210, the method includes estimating an intake air-charge being delivered to engine cylinders based on the lowered intake manifold pressure (MAP). For example, the engine controller may receive input regarding MAP from a MAP sensor and use the estimated MAP to determine a cylinder aircharge amount. Alternatively, the aircharge amount or MAP may be inferred based on manifold airflow, such as from a MAF sensor.

At 212, the method includes, while spinning the first compressor backwards, fueling engine cylinders based on the lower manifold pressure. Specifically, engine cylinders may be fueled based on the estimated cylinder aircharge amount, which is determined from the lowered MAP, to maintain combustion at or around stoichiometry. By reducing the manifold pressure and the cylinder charge requirement, the engine fueling requirement at the engine start is reduced while maintaining engine operation at stoichiometry. The reduced engine charge and fuel requirement results in a lower engine output torque and therefore a lower engine speed. As a result, an engine speed flare during the engine start is reduced.

A speed of rotating the first compressor backwards may be adjusted based on engine speed. In particular, the spinning backwards may include spinning backwards to maintain the engine speed below a threshold speed where engine flare-up may occur. For example, the controller may select a target speed and spin the first compressor backwards, while fueling the engine based on the lowered manifold pressure, so that the engine speed is brought to or within the target speed, and without allowing the engine speed to exceed the target speed. As another example, the controller may select a target speed profile and trajectory and adjust the spinning of the first compressor so as to bring an actual engine speed trajectory to match the target speed trajectory. The target trajectory may include a target run up of engine speed to a threshold speed, such as an idle speed. A speed of the backward spinning may be increased as the engine speed approaches or exceeds the target speed at any point along the target speed profile or trajectory. As used herein, spinning the first compressor backwards during the engine start includes spinning the first compressor backwards during an engine run-up to idle speed.

At 216, the method includes determining if the engine speed is at or above a threshold speed. For example, it may be determined if the engine speed during the engine start has run up to a targeted threshold speed along the target speed trajectory. In one example, the threshold speed is an engine idling speed. If the threshold speed has not been reached, at 216, the method includes maintaining the reverse rotation of the first compressor.

If the threshold speed has been reached, then at 218, first compressor reverse rotation may be stopped and discontinued. At 220, it may be determined if boost is required. In one example, boost may be required at mid-high engine loads. In another example, boost may be required in response to an operator pedal tip-in or increase in driver torque demand. If boost is not required, such as when the engine load is low or the driver torque demand is low, the method moves to 222 wherein the engine is operated with natural aspiration. While operating with natural aspiration, each of the first and second compressors are maintained deactivated.

If boost is required, then at 224, the method includes, enabling and accelerating the first, upstream compressor in a forward direction while the exhaust turbine coupled to the second, downstream compressor spins up. Herein, in response to an increase in driver demanded torque, the first compressor is rotated forward and a flow of compressed air to the engine is increased. In addition, while rotating the first compressor forward, the bypass valve (such as bypass valve 62) coupled across the supercharger is held closed. Accelerating the first compressor in the forward direction may include spinning the first compressor via the electric motor using power drawn from a battery, with the electric motor uncoupled from the reversing circuit. The first compressor is then accelerated in the forward direction based on the increase in boost demand (e.g., based on actual boost pressure relative to target boost pressure, or based on actual turbine speed relative to a threshold engine speed). In this way, after the engine reaches an idle speed during the engine start, in response to a demand for boost, while the exhaust turbine (and thereby the second compressor) spin up, the method includes spinning the first compressor forward and providing compressed air to the engine via the first compressor.

As such, electric superchargers may have a response time (that is, idle to 100% duty cycle) of 130-200 ms and therefore may be able to deliver boost much faster compared to a typical turbocharger response time (1-2 second). Therefore, the first compressor of the electric supercharger may be able to fill the turbo lag significantly faster.

As exhaust heat and pressure develops due to cylinder combustion, the exhaust turbine speed increases, driving the second compressor. At 226, it is determined if the turbine speed is higher than a threshold, such as above a threshold speed where the turbocharger is able to sustain the boost demand. If not, at 228, forward rotation of the first compressor (of the supercharger) is maintained.

If turbine speed is higher than the threshold, then at 230, the method includes decelerating the first compressor, by disabling the electric motor for example. Additionally, the bypass valve (such as bypass valve 62) may be opened allowing air to bypass the first compressor and flow to the (downstream) second compressor. Thus, after the turbine has spun up sufficiently, the method includes bypassing the first, upstream compressor and providing a flow of compressed air to a piston engine via the second, downstream compressor. Herein, compressed air is not provided to the engine via the first compressor. By transiently operating the first compressor of the supercharger until the turbocharger turbine is spun up, turbo lag due to delays in spinning up the second compressor are reduced.

In this way, during an engine start, before engine speed reaches idling speed, a first, upstream compressor may be spun backwards with a second, downstream compressor deactivated to reduce engine flare. Then, after the engine speed reaches the idling speed, the first compressor may be spun forward with the second compressor maintained deactivated to reduce turbo lag.

It will be appreciated that if a further increase in torque demand is received, such as due to a further pedal tip-in, and the torque demand cannot be met by the pressurized air provided via only the second compressor, the first compressor may be reactivated and spun forward via the electric motor. Thereafter, pressurized air may be provided to the engine via each of the first and second compressors.

Figure 3:
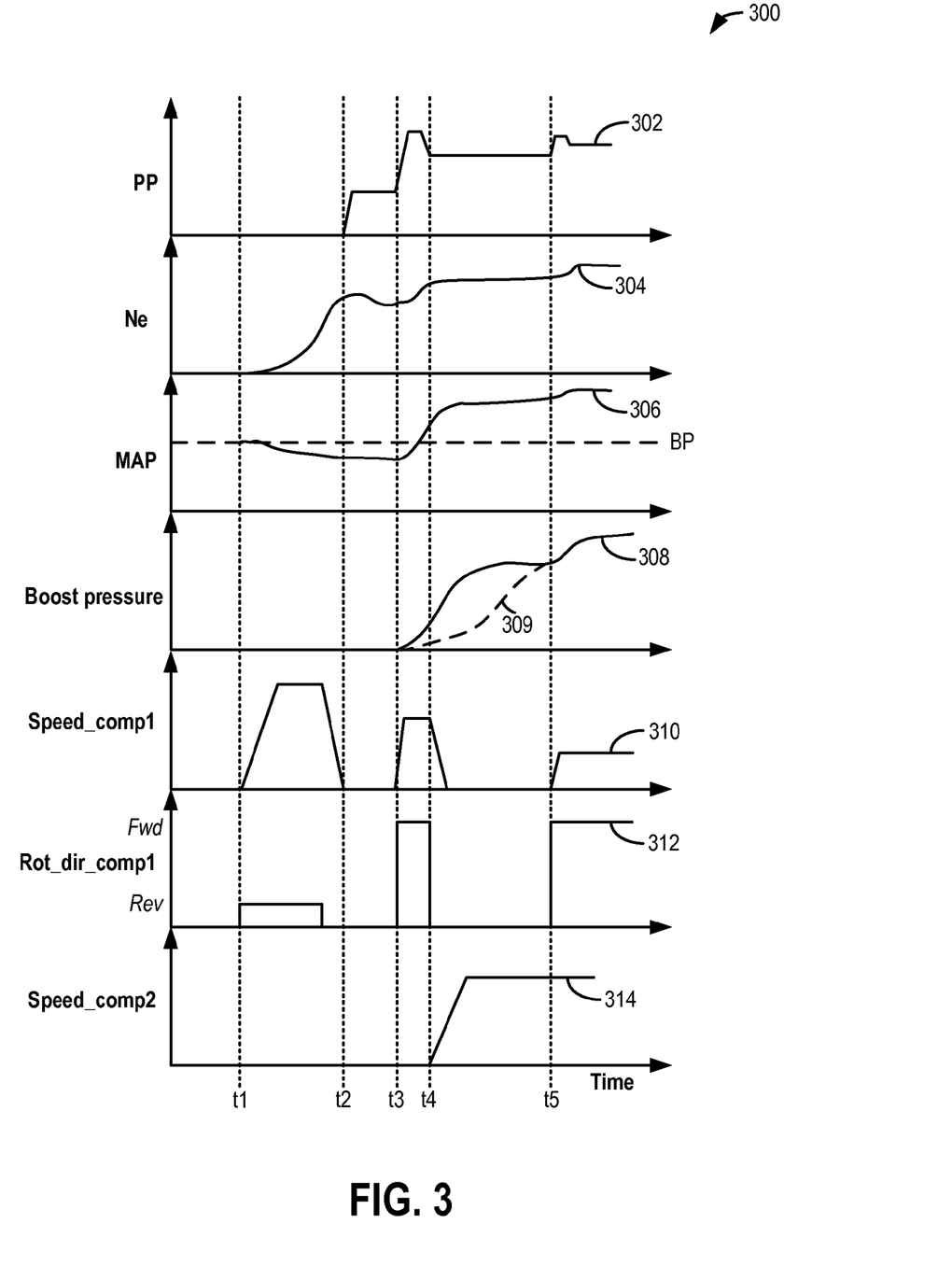
FIG. 3 shows example adjustments that may be used to reduce engine start speed flare.

Turning now to FIG. 3, an example map 300 is shown for improving engine flare control via reverse rotation of a supercharger compressor in a staged boosted engine system. Map 300 depicts pedal position (PP) at plot 302, engine speed (Ne) at plot 304, manifold pressure (MAP) at plot 306, boost pressure at plot 308, the speed of rotation a first upstream compressor of a supercharger (speed_comp1) at plot 310, a direction of rotation of the first compressor (Rot_dir_comp1) at plot 312, and the speed of rotation a second, downstream compressor of the turbocharger (speed_comp2) at plot 314. All plots are shown over time, along the x-axis. Note that elements aligning at a common time on the graph, such as at time t1 for example, are occurring concurrently, including for example where one parameter is increasing while another parameter is decreasing.

Prior to t1, the engine may be shutdown. At t1, the engine may be started in response to an ignition event. During the engine restart, to reduce engine speed flare-up, the first compressor of an upstream electric supercharger is spun (plot 310) via an electric motor. In particular, the first, upstream compressor is reverse rotated (plot 312) via the electric motor between t1 and t2. Due to the reverse rotation of the first compressor, a manifold pressure (MAP) of the engine starts to reduce (plot 306). In the present example, the manifold pressure drops relative to barometric pressure BP. The engine is concurrently fueled during the engine start based on the lowered MAP, resulting in the need for relatively less fuel. In addition, relatively less engine torque is output by the engine, resulting in less engine speed, and therefore a reduction in engine flare-up (plot 304).

At t2, the engine speed reaches a threshold speed (such as an idling speed). In response to the threshold speed being reached, first compressor reverse rotation is stopped. Shortly after t2, an operator torque demand is received based on a change in pedal position. Herein, the torque demand is not high enough to require boosted engine operation. Accordingly, the engine is operated with natural aspiration and the first and second compressors are not spun.

At t3, an operator pedal tip-in event occurs indicating an increase in the operator torque demand. Herein, the higher torque demand results in boosted engine operation being required. To reduce turbo lag that would be incurred while the exhaust turbine coupled to the second compressor spools, in response to the boost demand, the first compressor is spun via the electric motor. In particular, the first, upstream compressor is rotated in the forward direction (plot 312) via the electric motor for a duration between t3 and t4 to raise the boost pressure. In particular, between t3 and t4, air compressed by the first compressor is delivered to the engine. At t4, the boost pressure (provided via the first compressor) reaches a threshold pressure responsive to which forward rotation of the first compressor is discontinued.

Also between t3 and t4, as boosted engine operation ensues, and exhaust gas temperature and pressure increases, the turbine of the turbocharger may spool up, such that at t4, the second compressor can be accelerated. At t4, once the second compressor is spooled up and running, and the first compressor is decelerated, air compressed by the second compressor may be delivered to the engine while bypassing the first compressor (such as by opening a bypass valve in a bypass coupled across the first compressor). Between t3 and t4, torque demand and boost pressure may be provided via the second compressor only.

At t5, due to a further operator pedal tip-in, the operator torque demand further increases and a further increase in boost pressure is required. However, the required boost pressure is higher than the boost pressure that can be provided by the second compressor alone. Therefore, at t5, the first compressor is re-enabled and rotated in the forward direction via the electric motor to provide a boost assist to the second compressor.

In this way, a first, compressor of a supercharger coupled upstream of a second compressor of a turbocharger is selectively rotated backwards during an engine start to reduce engine flare, and then selectively rotated forwards during a tip-in to reduce turbo lag and/or provide boost assist.

One example method for an engine comprises: during an engine start, spinning a compressor backwards to lower intake manifold pressure, a speed of the compressor based on engine speed. In the preceding example method, additionally or optionally, the spinning backwards includes spinning backwards to maintain the engine speed below a threshold speed. In any or all of the preceding example methods, additionally or optionally, during the engine start includes during an engine run-up to idle speed. In any or all of the preceding example methods, the compressor is a first, upstream compressor driven by an electric motor, and the method additionally or optionally further comprises, while spinning the first compressor backwards, not spinning a second, downstream compressor, the second compressor driven by an exhaust turbine via a shaft. Any or all of the preceding example methods may additionally or optionally further comprise, after the engine reaches the idle speed, spinning the first compressor forward until a speed of the turbine is above a threshold turbine speed, and then decelerating the first compressor. In any or all of the preceding example methods, spinning the first compressor backwards may additionally or optionally include selectively coupling the electric motor to a reversing circuit, and spinning the first compressor forwards may additionally or optionally include selectively decoupling the electric motor from the reversing circuit. In any or all of the preceding example methods, additionally or optionally, the speed of the compressor based on engine speed may include increasing the speed of the compressor as the engine speed approaches or exceeds the threshold speed. Any or all of the preceding example methods may additionally or optionally further comprise, while spinning the first compressor backwards, holding an intake throttle open and fueling engine cylinders based on the lower manifold pressure.

Another example method for a boosted engine comprises: during an engine start, before engine speed reaches idling speed, spinning a first, upstream compressor backwards with a second, downstream compressor deactivated; and after engine speed reaches idling speed, spinning the first compressor forward with the second compressor maintained deactivated. In the preceding example, additionally or optionally, the first compressor is a supercharger compressor driven by an electric motor, and the second compressor is a turbocharger compressor driven by an exhaust turbine via a shaft. Additionally or optionally, in any or all of the preceding example methods, spinning the first compressor backwards includes spinning the first compressor at a speed based on engine speed relative to idling speed, and spinning the first compressor forward includes spinning the first compressor at a speed based on a turbine speed of the exhaust turbine. Any or all of the preceding example methods may additionally or optionally further comprise, after the engine speed reaches idling speed, maintaining the second compressor deactivated while spinning the first compressor forward until a turbine speed of the exhaust turbine reaches a threshold speed. Any or all of the preceding example methods may additionally or optionally further comprise, after the turbine speed reaches the threshold speed, deactivating the first compressor and spinning the second compressor forward. Additionally or optionally, in any or all of the preceding example methods, deactivating the first compressor and spinning the second compressor forward includes bypassing the first compressor and providing pressurized air to the engine via the second compressor. Any or all of the preceding example methods may additionally or optionally further comprise, in response to an increase in torque demand while spinning the second compressor forward, spinning the first compressor forward and providing pressurized air to the engine via each of the first and second compressor.

Another example engine system comprises: an engine having an intake manifold; an intake throttle; a pedal for receiving an operator torque demand; a fuel injector coupled to an engine cylinder; a first intake compressor driven by an electric motor, the motor powered by a battery; a reversing circuit selectively couplable to the electric motor; a second intake compressor driven by an exhaust turbine, the first compressor positioned upstream of the first compressor along an intake passage; a pressure sensor coupled to the intake manifold; and a controller. The controller may be configured with computer readable instructions stored on non-transitory memory for: in response to an engine restart request, rotating the first compressor backwards via the motor to generate intake manifold vacuum; and during the rotating, fueling the engine cylinder based on an estimated manifold pressure until an engine speed reaches a threshold speed. In the preceding example system, the controller additionally or optionally includes further instructions for: while rotating the first compressor backwards, holding the intake throttle open. In any or all of the preceding example systems, the controller additionally or optionally includes further instructions for: coupling the electric motor to the reversing circuit to spin the first compressor backwards; and after the engine speed reaches the threshold speed, discontinuing rotation of the first compressor while continuing to fuel the engine cylinder based on the estimated manifold pressure. In any or all of the preceding example systems, the controller additionally or optionally includes further instructions for: in response to a pedal tip-in, decoupling the electric motor from the reversing circuit and rotating the first compressor forwards via the electric motor, without rotating the second compressor, until a turbine speed is higher than a threshold turbine speed; and after the turbine speed is higher than the threshold turbine speed, decelerating the first compressor and rotating the second compressor via the turbine based on the operator torque demand. Any or all of the preceding example systems may additionally or optionally further comprise a bypass coupling an inlet of the first compressor to an outlet of the first compressor, the bypass including a bypass valve, and the controller may additionally or optionally include further instructions for: holding the bypass valve closed when rotating the first compressor backwards or forward; and opening the bypass valve when decelerating the first compressor to provide pressurized air to the engine via only the second compressor.

In this way, an electric supercharger can be advantageously used during an engine start to rapidly lower a manifold pressure and reduce engine speed flare. In particular, the quick response time of the electric supercharger can be leveraged to reduce the manifold pressure within the short time of an engine run-up to idle. By spinning the supercharger compressor backwards at the engine start, an engine start charge requirement can be lowered, reducing the fuel requirement. The consequent drop in engine torque and speed enables the engine speed to run-up according to a target trajectory, and with reduced flare. By spinning the same supercharger compressor forwards during other conditions, turbo lag can be addressed in a multi-staged engine system wherein the supercharger is positioned upstream of a turbocharger. As such, this allows the same engine components to be used to enhance engine performance both during engine starts and after engine run-up to idle speeds. By reducing engine speed flare, engine start NVH issues are reduced, improving engine startability and operator perceived drive quality. In addition, fuel losses associated with engine start speed flare are reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during an engine run-up to idle speed:
      spinning a first compressor with a motor opposite a normal direction to lower intake manifold pressure, wherein a speed of the first compressor spinning is based on engine speed, the first compressor being driven by an electric motor; while
      not spinning a second compressor located downstream of the first compressor, the second compressor driven by an exhaust turbine via a shaft.

2. The method of claim 1, wherein the spinning opposite the normal direction is reduced upon the engine reaching idle speed.

3. The method of claim 1, further comprising, in response to the engine reaching the idle speed, spinning the first compressor forward until a speed of the turbine is above a threshold turbine speed, and then decelerating the first compressor.

4. The method of claim 3, wherein the spinning the first compressor opposite the normal direction includes selectively coupling the electric motor to a reversing circuit, and wherein the spinning the first compressor forward includes selectively decoupling the electric motor from the reversing circuit.

5. The method of claim 2, wherein the speed of the first compressor spinning based on the engine speed includes increasing the speed of the first compressor spinning as the engine speed approaches or exceeds a threshold speed.

6. The method of claim 1, further comprising, while spinning the first compressor opposite the normal direction, holding an intake throttle open and fueling engine cylinders based on the lower manifold pressure.

7. A method for a boosted engine, comprising:
   during an engine start,
      before engine speed reaches idling speed, spinning a first compressor opposite a normal direction with a second compressor deactivated; and
      in response to the engine speed reaching idling speed, spinning the first compressor forward with the second compressor maintained deactivated,
   wherein the first compressor is a supercharger compressor driven by an electric motor, and wherein the second compressor is a turbocharger compressor driven by an exhaust turbine via a shaft located downstream of the first compressor.

8. The method of claim 7, wherein spinning the first compressor backwards includes spinning the first compressor at a speed based on engine speed relative to idling speed, and wherein spinning the first compressor forward includes spinning the first compressor at a speed based on a turbine speed of the exhaust turbine.

9. The method of claim 7, further comprising, in response to the engine speed reaching idling speed, maintaining the second compressor deactivated while spinning the first compressor forward until a turbine speed of the exhaust turbine reaches a threshold speed.

10. The method of claim 9, further comprising, in response to the turbine speed reaching the threshold speed, deactivating the first compressor and spinning the second compressor forward.

11. The method of claim 10, wherein deactivating the first compressor and spinning the second compressor forward includes bypassing the first compressor and providing pressurized air to the engine via the second compressor.

12. The method of claim 11, further comprising, in response to an increase in torque demand while spinning the second compressor forward, spinning the first compressor forward and providing pressurized air to the engine via each of the first and second compressors.

13. An engine system, comprising:
   an engine having an intake manifold;
   an intake throttle;

a pedal for receiving an operator torque demand;
a fuel injector coupled to an engine cylinder;
a first intake compressor driven by an electric motor, the motor powered by a battery;
a reversing circuit selectively couplable to the electric motor;
a second intake compressor driven by an exhaust turbine, the first compressor positioned upstream of the first compressor along an intake passage;
a pressure sensor coupled to the intake manifold; and
a controller with computer readable instructions stored on non-transitory memory for:
  determining estimated manifold pressure; and
  in response to an engine restart request,
    rotating the first compressor opposite a normal direction via the motor to generate intake manifold vacuum; and
    during the rotating the first compressor the opposite the normal direction, fueling the engine cylinder based on the estimated manifold pressure until an engine speed reaches a threshold speed.

14. The system of claim 13, wherein the controller includes further instructions for: while rotating the first compressor backwards, holding the intake throttle open.

15. The system of claim 13, wherein the controller includes further instructions for:
  coupling the electric motor to the reversing circuit to spin the first compressor backwards; and
  after the engine speed reaches the threshold speed, discontinuing rotation of the first compressor while continuing to fuel the engine cylinder based on the estimated manifold pressure.

16. The system of claim 15, wherein the controller includes further instructions for:
  in response to a pedal tip-in,
    decoupling the electric motor from the reversing circuit and rotating the first compressor forward via the electric motor, without rotating the second compressor, until a turbine speed is higher than a threshold turbine speed; and
    after the turbine speed is higher than the threshold turbine speed, decelerating the first compressor and rotating the second compressor via the turbine based on the operator torque demand.

17. The system of claim 16, further comprising a bypass coupling an inlet of the first compressor to an outlet of the first compressor, the bypass including a bypass valve, wherein the controller includes further instructions for:
  holding the bypass valve closed when rotating the first compressor backwards or forward; and
  opening the bypass valve when decelerating the first compressor to provide pressurized air to the engine via only the second compressor.

* * * * *